US011420859B2

(12) United States Patent
Businaro

(10) Patent No.: US 11,420,859 B2
(45) Date of Patent: Aug. 23, 2022

(54) DEVICE FOR ASSEMBLING PLASTIC OBJECTS

(71) Applicant: TELEROBOT S.p.A., Genoa (IT)

(72) Inventor: Andrea Francesco Businaro, Strevi (IT)

(73) Assignee: INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 16/615,601

(22) PCT Filed: Apr. 10, 2018

(86) PCT No.: PCT/IB2018/052491
§ 371 (c)(1),
(2) Date: Nov. 21, 2019

(87) PCT Pub. No.: WO2018/215851
PCT Pub. Date: Nov. 29, 2018

(65) Prior Publication Data
US 2020/0156914 A1 May 21, 2020

(30) Foreign Application Priority Data

May 22, 2017 (IT) .......................... 102017000055395

(51) Int. Cl.
*B67B 3/26* (2006.01)
*B67B 3/20* (2006.01)

(52) U.S. Cl.
CPC ............ *B67B 3/262* (2013.01); *B67B 3/2013* (2013.01); *B67B 3/2066* (2013.01)

(58) Field of Classification Search
CPC .... B67B 3/00; B67B 3/02; B67B 3/10; B67B 3/12; B67B 3/18; B67B 3/20;
(Continued)

(56) References Cited

U.S. PATENT DOCUMENTS 4,972,494 A * 11/1990 White .................... B65B 19/28
209/535
5,647,245 A * 7/1997 Takei .................. F16H 25/2018
74/89.3
(Continued)

FOREIGN PATENT DOCUMENTS

EP  1 236 674 A1  9/2002
EP  3 153 413 A1  4/2017
(Continued)

OTHER PUBLICATIONS

Italian Search Report and Written Opinion for corresponding Italian Patent Application: IT 102017000055395, seven pages, completed Jan. 11, 2018.
(Continued)

*Primary Examiner* — Andrew M Tecco
*Assistant Examiner* — Jacob A Smith
(74) *Attorney, Agent, or Firm* — Vorys, Sater, Seymour & Pease

(57) ABSTRACT

A device for assembling plastic objects including caps for coupling to base support at least partially counter-shaped to the cap. The device includes at least part of an assembly line defining assembly path and assembly plane including the assembly path and plurality of spindles moveable along the assembly path by an apparatus and configured to controlledly pick up the caps, the spindles position and push the caps onto the base supports along the assembly path; positioning apparatus including first and second detectors, controller with auxiliary control system to translate and rotate spindles along directions perpendicular to assembly path and plane and third encoder to detect spindle orientation relative to assembly path. First detector to detect first orientation, second detector to detect second orientation and controller to detect first orientation and second orientation by detectors
(Continued)

and operate auxiliary control system to align base support and cap.

8 Claims, 4 Drawing Sheets

(58) Field of Classification Search
CPC ... B67B 3/2013; B67B 3/2033; B67B 3/2066; B67B 3/262; B67B 3/264
USPC .......................................... 53/67, 317, 331.5
See application file for complete search history.

(56) References Cited

U.S. PATENT DOCUMENTS

| | | | | |
|---|---|---|---|---|
| 2002/0196434 | A1* | 12/2002 | Takakusaki | G01N 21/9054 356/240.1 |
| 2005/0150193 | A1* | 7/2005 | Bernhard | B67B 3/2033 53/490 |
| 2006/0272284 | A1* | 12/2006 | Galimberti | B67B 3/2033 53/75 |
| 2010/0307110 | A1* | 12/2010 | Wilhelm | B67B 3/12 53/329.2 |
| 2011/0131923 | A1* | 6/2011 | Schonfelder | B67B 3/28 53/287 |
| 2011/0162332 | A1* | 7/2011 | Hecktor | B67B 3/06 53/488 |
| 2012/0017539 | A1* | 1/2012 | Neufeld | H02K 16/00 53/285 |
| 2012/0314213 | A1* | 12/2012 | Herrmann | B67B 3/262 356/240.1 |
| 2016/0052190 | A1* | 2/2016 | Frankenberger | B67C 7/0046 156/500 |
| 2017/0073205 | A1* | 3/2017 | Vesentini | B67B 3/2053 |
| 2018/0170596 | A1* | 6/2018 | Marcantoni | B67B 3/26 |
| 2019/0248637 | A1* | 8/2019 | Ramnarain | B67B 3/26 |
| 2019/0256336 | A1* | 8/2019 | Takaku | B65B 55/04 |

FOREIGN PATENT DOCUMENTS

| | | | | |
|---|---|---|---|---|
| JP | 09169392 | A | * 6/1997 | |
| JP | 2000327086 | A | * 11/2000 | ............. B67B 3/262 |
| WO | 2015/115891 | A1 | 8/2015 | |

OTHER PUBLICATIONS

International Search Report for corresponding International PCT Application: PCT/IB2018/052491, two pages, dated Jun. 28, 2018.

* cited by examiner

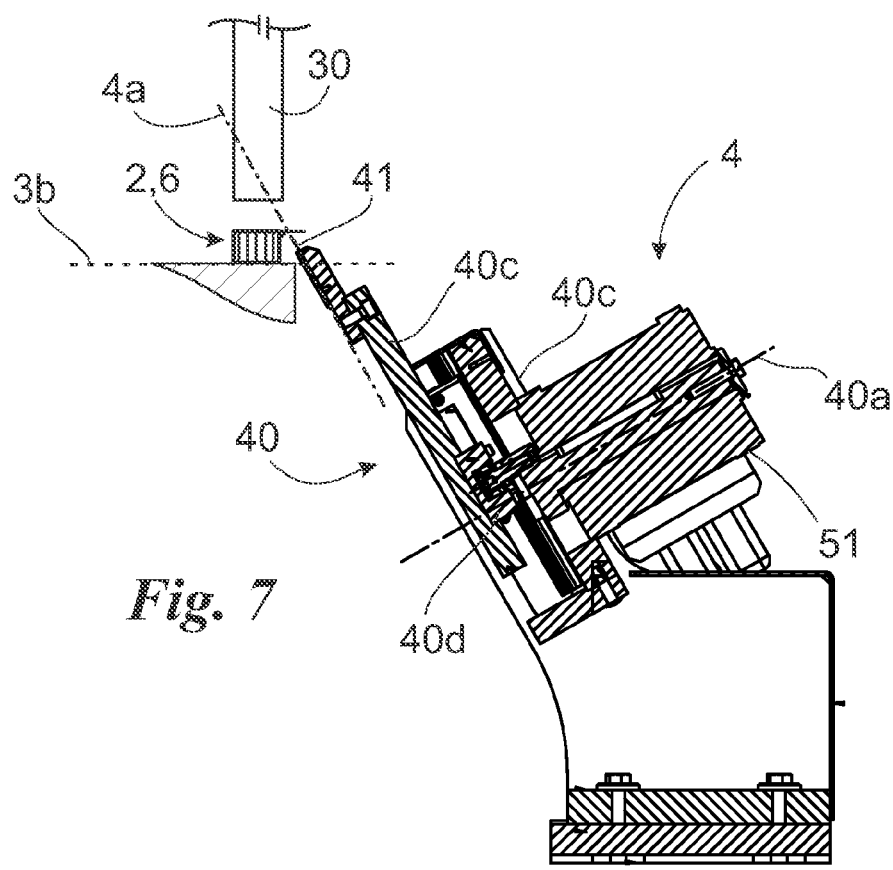
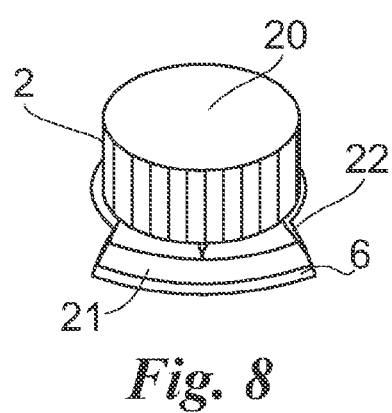

DEVICE FOR ASSEMBLING PLASTIC OBJECTS

The object of the present invention is a device for assembling plastic objects of the type as recited in the preamble of Claim 1.

In particular, the object of the present invention is a cutting device for objects such as caps, for example.

As is known, caps for food products have two main components: the lid portion and the tamper evidence portion designed to certify the proper closure of the food container.

Examples of these are the rings comprised in the caps of ordinary bottles of liquids, such as beverages or water and so on, which are separated from the lid portion by means of small notches.

Between the notches there are also small tabs designed to be broken or torn when the bottle is opened for the first time.

This method guarantees the protection of the food product in the container before it is used by a user.

In the case of Tetra-Pak® containers, such as those used for milk or fruit juice or the like, for example, the lid portion is usually separated from the tamper evidence portion by a plurality of tabs.

In order to meet the minimum seal strength requirements established by law there must be three of such tabs, for example.

However, it can be observed that, in the example mentioned above, when presented to the end user such caps comprise just two tabs.

This is due to the fact that, when the cap has undergone all the necessary machining processes, the central tab is removed in order to enable the user to open the cap properly to use the product and then replace the cap.

Besides, the caps used on the containers described above usually undergo a process during which the cap is coupled to a base support by means of screwing or a cold plastic deformation process.

In order to perform such operations, in the present state of the art, use is made of substantially automated machines capable of processing a plurality of parts, in detail caps, in series.

In particular, such machines comprise a rotary mechanism comprising spindles, arranged radially with respect to a central shaft, suitable to pick caps up from a continuous line of caps and suitable to compress said caps, including the lid portion and tamper evidence portion, onto a base support, which is normally rigid, by means of a cold moulding process.

Furthermore, during the rotation, a cutting blade, arranged on each spindle, is designed to remove the central tab arranged between the lid portion and the tamper evidence portion.

When the machining process is complete, the finished caps are conveyed back onto a line and away from the processing machinery.

The prior art described above has several significant drawbacks.

In particular, said machinery comprises a large number of internal components which result in increased complexity as well as higher costs.

Furthermore, during coupling, misalignments may occur between the plastic objects, in detail between the caps and supports, which could lead to damage to said objects or incorrect coupling.

In particular, the need to perform precise cuts, to avoid breaking the side tabs that join the lid portion and the tamper evidence portion, has led to the solution in which there is a cutter on each spindle.

Therefore, each single spindle is costly, both technologically and economically.

In addition, the mechanical connections between the spindle, which rotates, and the actuators designed to operate the blades are complex and may result in inaccuracies which, in the long term, prevent the full optimisation of the production line.

Lastly, the cutting systems do not take into account the positioning of the cap and of the base support and can therefore cause undesirable damage with loss of products and waste.

In this situation the technical purpose of the present invention is to develop an assembly device for plastic objects able to substantially overcome at least some of the inconveniences mentioned above.

Within the sphere of said technical purpose one important aim of the invention is to provide a device that makes it possible to simplify the system and, therefore, the structure of the rotary plant used to couple the caps to the base supports.

Another important aim of the invention is to provide an assembly device for plastic objects that reduces the costs of production for processing machinery.

A further aim of the invention is to optimise the production of caps by increasing the speed of coupling.

In conclusion, another aim of the invention is to limit the damage to the caps being processed in order to reduce the amount of waste that is produced.

The technical purpose and specified aims are achieved with an assembly device for plastic objects as claimed in the appended Claim 1. Examples of a preferred embodiment are described in the dependent claims.

The characteristics and advantages of the invention are clearly evident from the following detailed description of preferred embodiments thereof, with reference to the accompanying drawings, in which:

FIG. 7 is a side view of an example of the cutting mechanism working;

FIG. 8 shows a view from above of the cap and the base support in the assembly configuration; and FIG. 9 shows a view from above of the cap and the base support in the assembly configuration.

Figure 1:
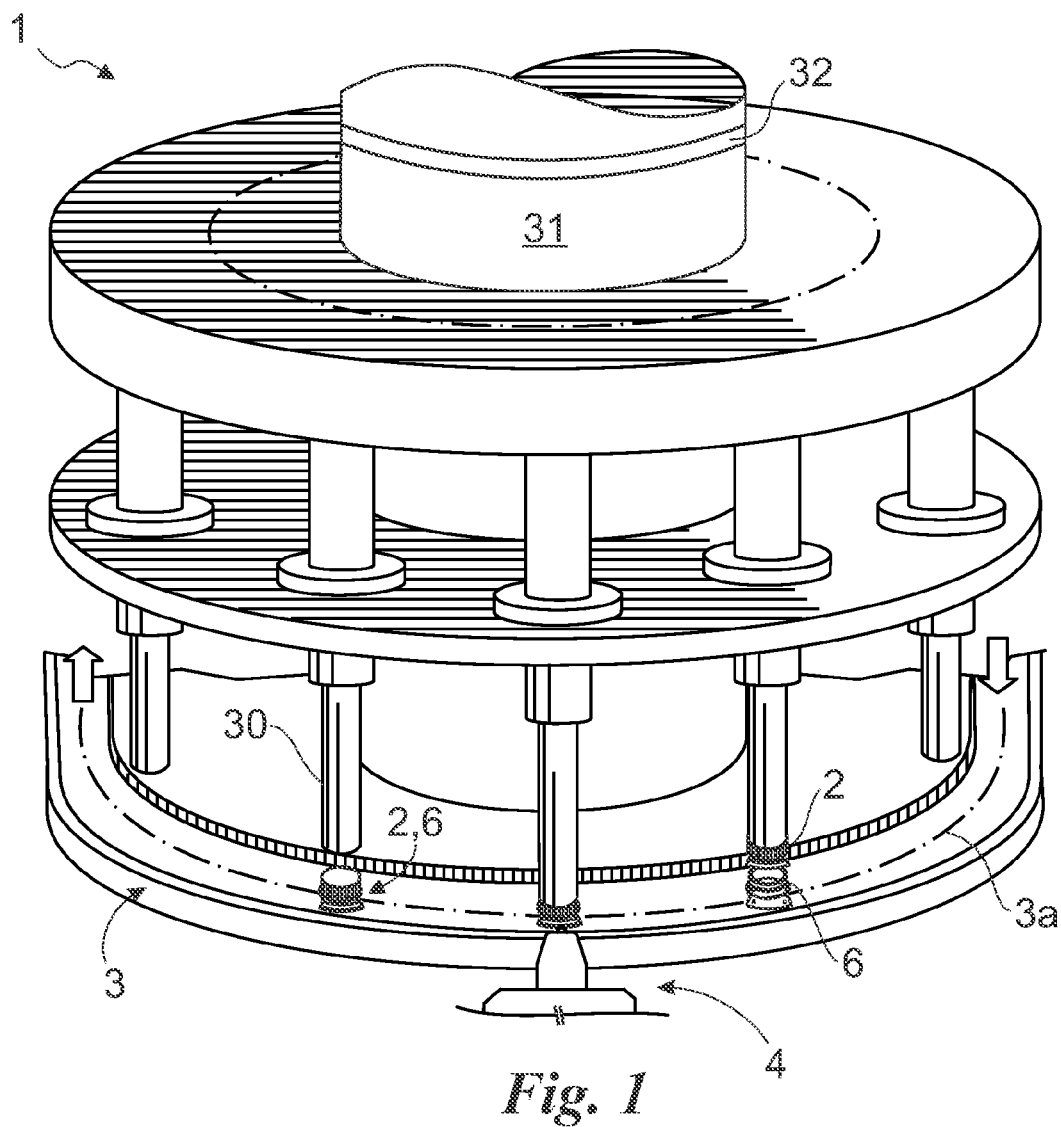
FIG. 1 shows the assembly device for plastic objects according to the invention and the cutting member.
Figure 2:
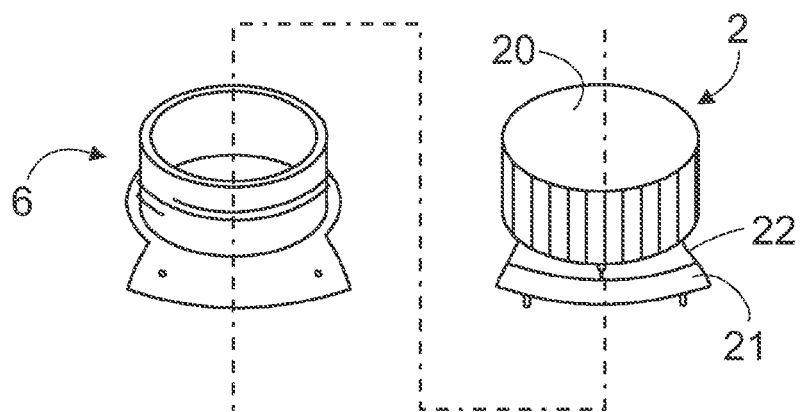
FIG. 2 is an exploded view of a cap suitable to be processed by the assembly device.
Figure 3:
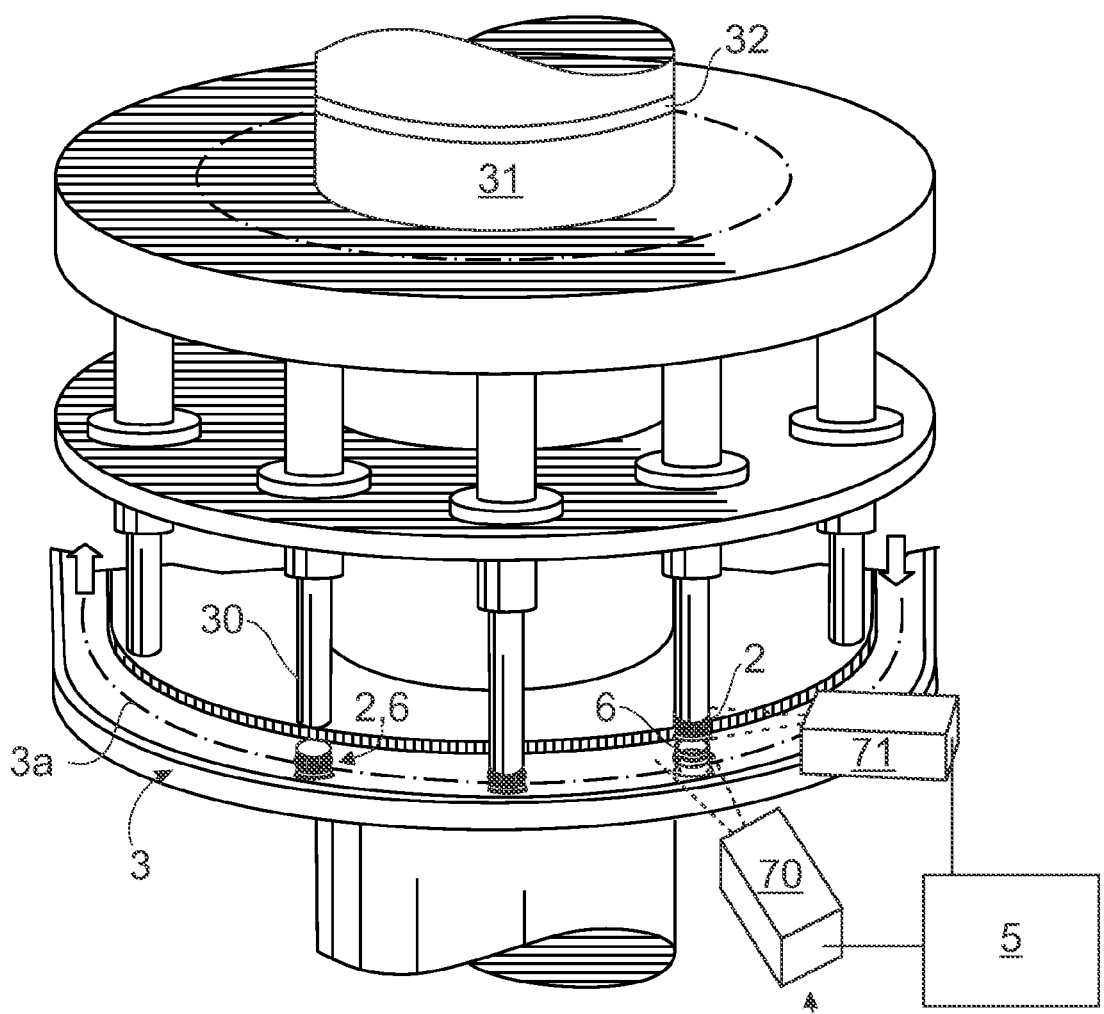
FIG. 3 shows the assembly device for caps according to the invention and the positioning apparatus.
Figure 4A:
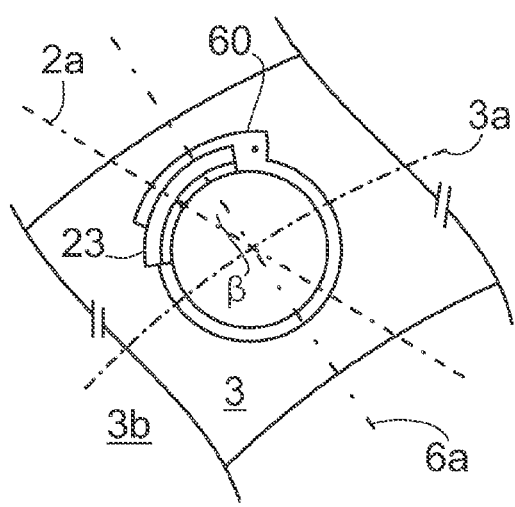
FIG. 4a illustrates an example of comparison between the images acquired by the detectors according to the invention.
Figure 4B:
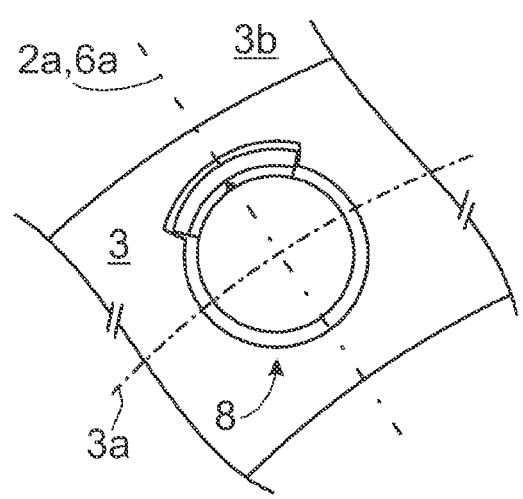
FIG. 4b illustrates an example of a specimen image according to the invention.
Figure 5:
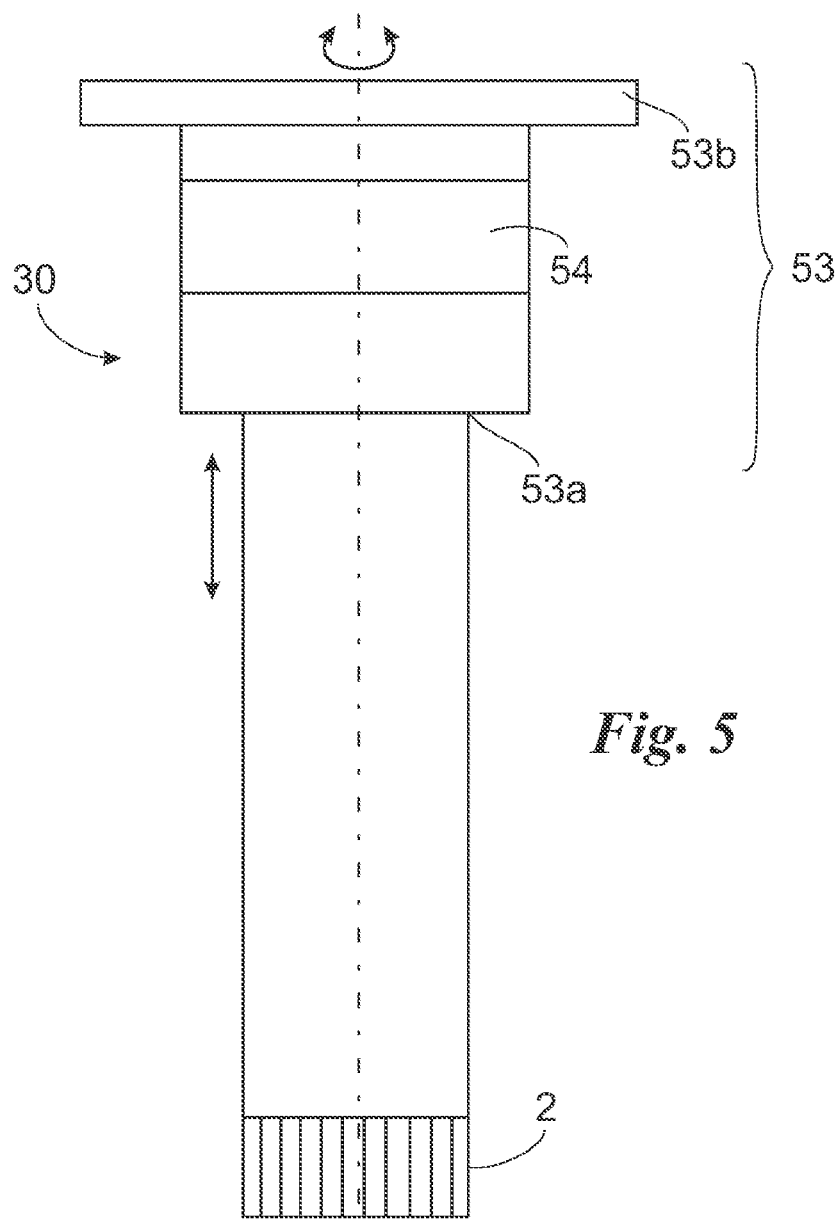
FIG. 5 is a spindle comprising the auxiliary control system according to the invention.
Figure 6:
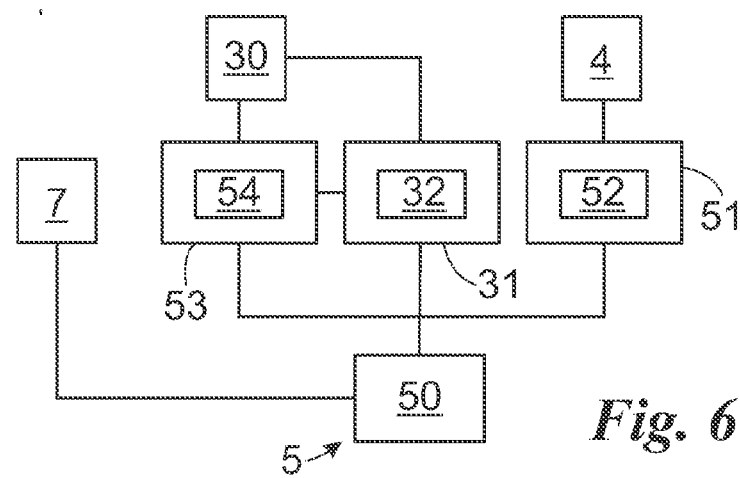
FIG. 6 is a diagram of the control means according to the invention.

In this document, measurements, values, forms and geometric data (such as perpendicularity and parallelism), when used with terms such as "about" or other similar terms such as "more or less" or "substantially", are to be considered without any measurement errors or inaccuracies due to production and/or manufacturing errors and, above all, without any slight divergence from the value, measurement, form or geometric data with which they are associated. For example, such terms, when associated with a value, preferably indicate a difference of not more than 10% of said value.

Moreover, terms such as "first", "second", "upper", "lower", "main" and "secondary" do not necessarily indicate an order, priority or respective position, but may simply be used in order to make a clear distinction between the different components. Unless otherwise indicated, the measurements and data provided in this document are to be considered using International Standard Atmosphere ICAO (ISO 2533). With reference to the Figures, reference numeral 1 globally denotes the assembly device for plastic objects according to the invention.

The device 1 is preferably suitable to process plastic objects such as, for example, caps 2.

The caps 2 are preferably caps of a known type used mainly for closing Tetra-Pak® containers used, for example, to contain fruit juice, milk and so on.

Therefore, the caps 2 may comprise a lid portion 20 and a tamper evidence portion 21.

The lid portion 20 is, for example, a lid comprising one or more portions and preferably comprises a portion defining a screw cap of a known type.

The tamper evidence portion 21 is, instead, an element outside of the lid portion 20 suitable to guarantee that the product contained in the food container has not been tampered with.

It may comprise holes for coupling to external elements.

Preferably, the lid portion 20 and the tamper evidence portion 21 are two distinct elements joined by one or more tabs 22.

In particular, the lid portion 20 and the tamper evidence portion 21 are joined by at least three tabs 22 and, more appropriately, three tabs 22.

Preferably, the device 1 is suitable to cut at least one of the tabs 22 and, more appropriately, the tab 22 arranged in a central area.

The cutting of the central tab 22, in particular, is due to the fact that before being coupled to a base support, the cap 2 is designed to guarantee compliance with the standard strength requirements established by current regulations.

Furthermore, the caps 2 are, preferably, suitable to be coupled to a base support 6. Said base support 6 is substantially at least partially counter-shaped with respect to the cap 2.

In particular, the base support 6 comprises a portion, of a known type, suitable to screw the cap 2 and a portion preferably comprising a number of protuberances suitable to be inserted into holes provided in the tamper evidence portion 21. Preferably, the device 1 is suitable to join the base support 6 and the cap 2 by means of a cold moulding process.

Essentially, the cap 2 and the base support 6 are, for example, joined by pushing them together and in such a way as to force the lid portion 20 to engage the thread on the base support 6 and to deform the protuberances by compression in order to join the tamper evidence portion 21 to the base support 6.

The device 1 could, however, be used to achieve coupling in other ways. For example, the cap 2 and the base support 6 could be screwed onto one another.

The device 1 further comprises at least part of an assembly line 3.

The assembly line 3 may comprise conveyor rollers of a known type, or other types of means suitable to define an assembly path 3a.

Therefore, the assembly line 3 defines an assembly path 3a along which a plurality of base supports 6 and caps 2 are moved.

The line 3 also defines an assembly plane 3b.

Said assembly plane 3b is substantially a plane that includes the assembly path 3a. In particular, preferably, in a preferred configuration, the base supports 6 are moved along the assembly path and plane 3a, 3b, while the caps 2 are moved along the assembly path 3a, but may be moved on variable planes parallel to the assembly plane 3b.

Alternatively, the caps 2 are moved along the assembly path and plane 3a, 3b, while the base supports 6 are moved along the assembly path 3a, but may be moved on variable planes parallel to the assembly plane 3b.

In this alternative configuration, preferably, the base supports 6 and the caps 2 are substantially inverted with respect to the preferred configuration.

Therefore, preferably, the device 1 defines a transport configuration in which the caps 2 travel along the assembly path 3a substantially specularly with respect to the corresponding base supports 6 along a plane parallel to and at a distance from the assembly plane 3b and an assembly configuration in which the caps 2, while moving, are brought close to the corresponding base supports 6, or vice versa, and therefore occupy a position along a plane that is substantially close to the assembly plane 3b.

Preferably, the assembly line 3 consists of a rotary machine and, therefore, the assembly path 3a is at least a portion of a circle.

However, the assembly line could also be a linear machine and the assembly path 3a substantially a straight line.

The device 1 further comprises an apparatus 31 and a plurality of spindles 30.

The apparatus 31 is a portion of the device suitable to move the spindles 30 along the assembly path 3a.

Preferably, the apparatus 31 comprises a drive shaft suitable to rotate about an axis that is centred with respect to the assembly path 3a and perpendicular to the assembly plane 3b.

In detail, the apparatus 31 turns the spindles 30 and preferably comprises a brushless motor. However, the apparatus 31 could also involve other solutions such as, for example, a mechanical link mechanism comprising gears and belts, or other system.

In addition, preferably, the apparatus 31 comprises a second encoder 32 suitable to detect the position, speed and angular acceleration of the apparatus 31.

The second encoder 32 is preferably of the type known in the prior art.

The spindles 30 are thus made to move along the assembly path 3a by the apparatus 31 and are suitable to pick up the caps 2 or the base supports 6 in a controlled manner.

In particular, the spindles 30 pick up the caps 2 or the base supports 6 from an external portion of the assembly line 3 that is not part of the device 1.

Each spindle 30 picks up a single cap 2 or base support 6 and, thus, the capacity of the device 1 depends on the number of spindles 30.

Preferably, there are a plurality of spindles 30, for example twenty-four, although their number may differ also depending on the dimensions of the device 1.

The spindles 30 are able to pick up the caps 2 or the base supports 6 by means of a coupling system, of a known type, which may be mechanical or electric or pneumatic.

For example, the spindles 30 may comprise a jaw suitable to grip a cap 2, or they may have a pneumatic device suitable to create a vacuum in order to attach the cap 2 to a portion thereof generally facing the assembly path 3a.

Moreover, the spindles 30 are suitable to push the caps 2 to join them to the base supports 6, or vice versa, arranged along the assembly path 3a on the assembly plane 3b.

Preferably the spindles 30 pick up the caps 2 in the way described above, when the spindles 30 move the caps 2 from the transport configuration to the assembly configuration.

The device 1 further comprises a positioning apparatus 7 and control means 5. Moreover, the device may comprise additional apparatuses, for example for processing plastic objects such as, for example, caps.

Therefore, the device 1 may (albeit not necessarily) comprise a cutting mechanism 4.

The cutting mechanism 4, if present, is for example suitable to cut at least a part of the tabs 22 on the caps 2.

Preferably the cutting mechanism 4 is suitable to cut, in particular, the central tab 22 when the spindles 30 carry the caps 2 or the base supports 6 in the assembly configuration.

Cutting is in fact preferably performed when the base support 6 and the cap 2 have been joined to one another and properly positioned.

The cutting mechanism 4 could alternatively cut a side tab 22 or more than one tab 22.

Moreover, preferably, the cutting mechanism 4 is not attached to any spindle 30. Furthermore, the device 1 preferably comprises just one cutting mechanism 4, since, advantageously, the cutting mechanism 4 is able to cooperate with each spindle and thus with each base support 6 and cap 2 at a fixed position along the assembly path 3a.

Therefore, preferably, the cutting mechanism 4 is preferably movably attached to part of the assembly line 3 in proximity to the path 3 and to the assembly plane 3a, 3b.

The cutting mechanism 4 thus defines a cutting direction 4a.

The cutting direction 4a is substantially the direction along which the cutting mechanism 4 and part of the cap 2 come into contact.

Preferably, the cutting direction 4a defines an angle α with the assembly plane 3b. The angle α is preferably comprised between 20 and 70 degrees and is more appropriately 45 degrees.

The cutting mechanism 4 further comprises movement means 40 and a cutting member 41.

The movement means 40 are preferably suitable to move the cutting member 41 along the cutting direction 4a so as to allow the cutting member to come into contact with a part of the tabs 22.

The movement means 40 thus define an axis of movement 40a.

The axis of movement 40a is, for example, perpendicular to the cutting direction 4a and the movement means comprise an alternator 40b and a support 40c.

Said alternator 40b is any device suitable to rotate about the movement axis 40a and, in particular, to change the rotational motion into alternating motion, whereas the support 40c is preferably suitable to releasably couple the cutting member 41. In particular, preferably, the alternator is an eccentric cam which, as it rotates about the movement axis 40a, is able to translate the support 40c along the cutting direction 4a with an alternating motion.

In particular, the motion of the alternator 40b is transmitted to the support 40c via transmission means 40d.

Preferably, the transmission means 40d are operationally connected to the alternator 40b and to the support 40c and consist of an ordinary crank mechanism. Therefore, the transmission means may be a bar hinged along part of the alternator 40b and the support 40c.

Alternatively, the movement means 40 may consist of members that rotate with an alternating motion comprising gears that interact with the support 40c. In that case, therefore, the support consists, for example, of a portion comprising cavities suitable to interact with the surface of the rotating gear.

The cutting member 41 is preferably a blade. Said blade may be of any kind, provided it is suitable to cut, for example, polymeric materials and in particular is of the type used in normal surgical scalpels.

The positioning apparatus 7 preferably comprises a first detector 70 and a second detector 71.

In particular, preferably, the detectors 70, 71 are video cameras suitable to detect a first image 60 and a second image 23, respectively.

The first image 60 is preferably an image of the base support 6 and the second image 23 is an image of the cap 2.

In detail, the images 60, 23 are preferably sections in a plane parallel to the assembly plane 3b of the base support 6 and of the cap 2, respectively.

The control means 5 are preferably suitable to control the movements of the device 1 and to acquire the signals coming from the components of said device 1. Preferably, the control means 5 are suitable to control and operationally interact with the cutting mechanism 4, the spindles 30 and the positioning apparatus 7.

They thus comprise a control system 50, a motor 51 and an auxiliary control system 53.

The motor 51 is preferably operationally connected to the movement means 40, if present in the device 1, and is thus suitable to make the cutting member 41 move. The motor 51 is a rotary motor, for example, of the brushless or electric or mechanical type.

Preferably, a first encoder 52 is linked to the motor 51.

The first encoder 52 is a device of the type known in the prior art and is suitable to detect the position, speed and angular acceleration of the motor 51.

The control system 50 is thus preferably an apparatus suitable to control at least the motor 51 and the apparatus 31.

Preferably, the control system 50 comprises an electronic processor suitable to interact with the first encoder 52 and the motor 51.

Preferably, the electronic processor comprises an electronic board of a known type and/or a numerical controller of a known type.

Furthermore, the control system 50 is suitable to interact with the second encoder 32 and, in particular, the control system 50 is suitable to synchronise the first and the second encoder 52, 32.

In detail, the control system 50 is suitable to control the motor 51 in such a way that a period of complete rotation of the motor 51 corresponds to the time in which the assembly line 3 covers the distance comprised between two spindles 30 along the assembly path 3a.

In this way, at each pass of a spindle 30, the cutting mechanism 4 advances and places the cutting member 41 in contact with a part of the tabs 22 and, in detail, with the central tab.

Preferably, to perform this action, the spindles 30 bring the caps 2 from the transport configuration to the assembly configuration.

The auxiliary control system 53 is suitable to bring the caps 2 from the transport configuration to the assembly configuration.

Preferably, the auxiliary control system 53 is suitable to translate and rotate the spindles 30 along directions perpendicular to the assembly path and plane 3a, 3b and comprises a third encoder 54.

The third encoder 54 is preferably an encoder of a known type suitable to detect the orientation of the spindles 30 with respect to the assembly path 3a.

In detail, the auxiliary control system 53 comprises a second actuator 53a and a first actuator 53b. The second actuator 53a is preferably removably attached to the apparatus 31 and is suitable to translate along the directions perpendicular to the path and plane of assembly 3a, 3b.

The second actuator 53b could be a linear actuator of a known type, or could comprise a barrel cam suitable to guarantee the translation.

Therefore, preferably, the second actuator 53a is suitable to allow the spindle 30 and thus a cap 2 to switch from the transport configuration to the assembly configuration.

The first actuator 53b is preferably removably attached to the spindle and to the second actuator 53a and is suitable to rotate the spindle 30 about the directions perpendicular to the assembly path and plane 3a, 3b.

Preferably, the second actuator 53a is a linear brushless actuator and the first actuator 53b is a rotary brushless actuator.

Preferably, the auxiliary control system 53 comprises a first and a second actuator 53b, 53a for each spindle 30.

Preferably, the control system 50 is suitable to process the signals arriving from the third encoder 54, the detectors 70, 71 and to control the auxiliary control system 53.

In detail, the control system 50 defines a specimen image 8 preferably for each assembled cap 2 and base support 6.

Preferably, the specimen image 8 is an image of the cap 2 and of the base support 6 in the assembly configuration.

Said specimen image 8 is, in particular, an image of comparison for the images 60, 23. The detectors 70, 71 acquire the first image 60 and the second image 23, respectively, and the control means 5 are suitable to compare the images 60, 23 with the specimen image 8.

Preferably, the first image 60 and the specimen image 8 define a first orientation 6a, while the second image 23 and the specimen image 8 define a second orientation 2a.

The first orientation 6a defines the orientation of the base support 6 with respect to the assembly path 3a, the second orientation 2a defines the orientation of the cap 2 with respect to the assembly path 3a.

Preferably, the specimen image 8 defines the first orientation 6a and the second orientation 2a in a plane parallel to the assembly path and plane 3a, 3b. Furthermore, the control means 5 calculate the angular displacement β between the first orientation 6a of the base support 6 and the second orientation 2a of the cap 2 calculated by comparing the images 60, 23 with the specimen image 8.

Preferably, the auxiliary control system 53 rotates the spindle 30 holding the cap 2, of which the second image 23 has been acquired, at an angle equal to the angular displacement β in order to align the base support 6 and the cap 2.

The functioning of the assembly device for caps 1 described above in a structural sense, is as follows.

The device 1 allows a plurality of base supports 6, arriving from part of an assembly line 3, to be moved along the assembly path 3a. At the same time the spindles 30 pick up a plurality of caps 2, in a synchronised manner.

During the transport configuration a first image 60 is acquired, by the first detector 70, of the base support 6 passing in front of the detector 70 and a second image 23, by the second detector 71, of the cap 2 passing in front of the second detector 71.

The images 60, 23 are compared with a specimen image 8 in order to define a first and a second orientation 6a, 2a.

Once the orientations have been obtained, the control means 5 calculate the angular displacement β between the orientations 6a, 2a.

If there is an angular displacement β, the control means, in detail the control system 50, move the auxiliary control system 53, in detail the second actuator 53b.

When the spindle 30 has been rotated by an angle equal to the angular displacement β thanks to the third encoder 54, the first actuator 53a moves the cap 2 towards the base support 6 and pushes the two components to join them together. As soon as the base support 6 and the cap 2 have been coupled, the spindle 30 turns the coupled cap 2 and base support 6 so that the orientations 6a, 2a are substantially perpendicular to the assembly path 3a so as to allow the cutting mechanism 4 to cut at least one tab 22 when driven by the motor 51.

When it turns, the motor 51 translates the cutting member 41 along the cutting direction 4a and then allows the blade to return to the retracted position.

When the cutting member 41 is in the forwardmost position, it comes into contact with, for example, the central tab 22 of the cap 2 and cuts it.

At the end of this step the cap 2 and the base support 6 are moved away by the device 1 along the remaining parts of the assembly line 3.

The device 1 according to the invention achieves some important advantages. Indeed, the device makes it possible to increase the precision of the system for coupling the caps to the base supports.

Another advantage of the invention is that it optimises the processing of plastic objects such as caps and increases the machinery's processing speed.

In the specific example, if the device 1 is provided with a cutting mechanism, the operation optimises the cutting of the caps and increases the cutting speed.

As a consequence, another advantage of the invention is that it reduces the costs of production for processing machinery.

In conclusion, another advantage of the invention is that it limits the damage to the caps being processed and so reduces the amount of waste produced.

Modifications and variations may be made to the invention described herein without departing from the scope of the inventive concept as defined in the claims.

For example, the assembly path 3a could be linear and not circular and the apparatus 31 could comprise rails along which the spindles 30 are moved.

All details may be replaced with equivalent elements and the scope of the invention includes all other materials, shapes and dimensions.

The invention claimed is:

1. A device for assembling plastic objects,
   said plastic objects comprising caps configured to be coupled to a base support that is substantially at least partially counter-shaped with respect to said cap,
   said cap comprising a lid portion and a tamper evidence portion, wherein said lid and tamper evidence portions are joined by at least one tab,
   said device comprising at least part of an assembly line of said caps and said base supports defining an assembly path and an assembly plane comprising said assembly path, and said device comprising:
a plurality of spindles configured to be moved along said assembly path by means of an apparatus and configured to pick up one of a choice between said caps and said base supports in a controlled manner,
said spindles configured to position and to couple by pushing without rotating one of a choice between said caps onto said base supports and said base supports onto said caps arranged along said assembly path on said assembly plane,
a positioning apparatus comprising at least a first detector and a second detector,
a control means comprising an auxiliary control system configured to translate and rotate said spindles along directions perpendicular to said assembly path and plane and comprising a third encoder configured to detect the orientation of said spindles with respect to said assembly path,
said first detector configured to detect said first orientation of said base support with respect to said assembly path,
said second detector configured to detect said second orientation of said cap with respect to said assembly path,
said control means configured to detect said first orientation of said base support and said second orientation of said cap by means of said detectors and to operate said auxiliary control system in order to align said base support and said cap,
wherein said detectors are video cameras configured to detect a first image of said base support and a second image of said cap and said control means are configured to compare said images with a specimen image, said first image and said specimen image defining said first orientation of said base support with respect to said assembly path and said second image and said specimen image defining said second orientation of said cap with respect to said assembly path, and
wherein said control means calculate an angular displacement (β) between said first orientation of said base support and said second orientation of said cap calculated by comparing said images with said specimen image and said auxiliary control system rotates said spindle holding said cap by said angular displacement (β) in order to align said base support and said cap before coupling them, in order to facilitate a cutting on the at least one tab by a cutting member placed in a predetermined position along the assembly path.

2. The device as claimed in claim 1, wherein said assembly line is a rotary machine, said assembly path is at least a portion of a circle and said apparatus comprises a shaft of a drive shaft configured to rotate about an axis centered with respect to said assembly path and perpendicular to said assembly plane.

3. The device as claimed in claim 1, wherein said specimen image is an image of said cap and said base support in the assembly configuration and defines said first orientation and said second orientation in a plane parallel to said assembly path and plane.

4. The device as claimed in claim 1, wherein said auxiliary control system comprises a second actuator and a first actuator for each of said spindles, said second actuator being removable attached to said apparatus and configured to translate along said directions perpendicular to said assembly path and plane and said first actuator being removably attached to said spindle and said second actuator and configured to rotate said spindle about said directions perpendicular to said assembly path and plane.

5. The device as claimed in claim 4, wherein said second actuator is a linear brushless actuator and wherein said first actuator is a rotary brushless actuator.

6. The device as claimed in claim 1, wherein said spindle is one of a choice between a mechanical, electric or pneumatic type.

7. The device as claimed in claim 1, wherein said control means comprise a control system configured to process signals coming from said detectors and said third encoder and to control said auxiliary control system.

8. The device as claimed in claim 1, wherein said control system comprises an electronic processor.

* * * * *